(12) United States Patent
Tran et al.

(10) Patent No.: US 7,204,029 B2
(45) Date of Patent: Apr. 17, 2007

(54) LEVEL

(75) Inventors: Tho Tran, West Hartford, CT (US); Joseph Martone, Bristol, CT (US)

(73) Assignee: The Stanley Works, New Britian, CT (US)

(*) Notice: Subject to any disclaimer, the term of this patent is extended or adjusted under 35 U.S.C. 154(b) by 0 days.

(21) Appl. No.: 11/121,183

(22) Filed: May 4, 2005

(65) Prior Publication Data

US 2006/0248738 A1  Nov. 9, 2006

(51) Int. Cl.
*G01C 9/24* (2006.01)

(52) U.S. Cl. ................................ 33/451; 33/379

(58) Field of Classification Search .......... 33/371–376, 33/451, DIG. 1, 379–390, 347
See application file for complete search history.

(56) References Cited

U.S. PATENT DOCUMENTS

| | | | |
|---|---|---|---|
| 692,097 A | 11/1902 | Wood | |
| 1,318,162 A | 10/1919 | Loring | |
| 1,563,321 A | 12/1925 | Bedortha | |
| 2,362,872 A | 11/1944 | Weagle | |
| 2,514,492 A | 7/1950 | Hayward | |
| 2,515,199 A | 7/1950 | Draper | |
| 2,535,791 A | 12/1950 | Fluke | |
| 2,608,001 A | 8/1952 | Barkalow | |
| 2,750,677 A | 6/1956 | Wirth | |
| 2,750,678 A | 6/1956 | Ziemann | |
| 2,789,363 A * | 4/1957 | Miley | 33/347 |
| 3,241,285 A | 3/1966 | Baroni | |
| D206,786 S | 1/1967 | McCormick | |
| 3,435,533 A | 4/1969 | Whitfield | |
| 3,618,222 A | 11/1971 | Ostrager | |
| 3,694,090 A | 9/1972 | Ohyama | |
| 3,721,489 A | 3/1973 | Horvath | |

(Continued)

FOREIGN PATENT DOCUMENTS

DE    7316496    7/1973

(Continued)

OTHER PUBLICATIONS

Partial Search Report for European Patent Appln. No. 06252369.1, dated Aug. 8, 2006.

*Primary Examiner*—Yaritza Guadalupe-McCall
(74) *Attorney, Agent, or Firm*—Pillsbury Winthrop Shaw Pittman LLP

(57) ABSTRACT

A level having a body with first and second operative walls interconnected by a web. The first wall having a first exterior operative surface and the second wall having a second exterior operative surface. The first surface and the second surface facing in opposite directions and being generally parallel to one another and the first exterior operative surface having an opening. The body further comprising a stop structure disposed between the operative walls. The level also including a level vial carried by the body and a magnet disposed in the opening and having one end abutting the stop structure. The magnet having an opposite end adjacent the first exterior operative surface for magnetically attracting a workpiece engaged with the first exterior operative surface. Another embodiment of a level includes a reinforcing wall disposed closer to the first operative wall than the second operative wall, with the reinforcing wall cooperating with the first operative wall to generally define a cavity.

43 Claims, 7 Drawing Sheets

U.S. PATENT DOCUMENTS

| | | | |
|---|---|---|---|
| 3,724,087 A | 4/1973 | Ostrager | |
| 3,727,242 A | 4/1973 | Miller | |
| 3,737,242 A | 6/1973 | Hesebeck | |
| 3,800,426 A | 4/1974 | Nakamura | |
| 4,002,000 A | 1/1977 | Howard et al. | |
| 4,011,660 A | 3/1977 | Johnson | |
| D244,837 S | 6/1977 | Thingstad et al. | |
| 4,130,943 A | 12/1978 | Talbot | |
| 4,164,077 A | 8/1979 | Thomas | |
| 4,202,608 A | 5/1980 | Kaufmann | |
| 4,208,803 A | 6/1980 | Brown et al. | |
| 4,245,513 A | 1/1981 | Clements | |
| 4,335,523 A | 6/1982 | Bryant | |
| 4,407,075 A | 10/1983 | MacDermott et al. | |
| 4,413,510 A | 11/1983 | McCusker et al. | |
| 4,419,833 A * | 12/1983 | Wright | 33/379 |
| 4,463,501 A | 8/1984 | Wright et al. | |
| 4,506,450 A | 3/1985 | Fleming et al. | |
| 4,506,451 A | 3/1985 | Hiltz | |
| 4,593,475 A * | 6/1986 | Mayes | 33/347 |
| 4,860,459 A | 8/1989 | Dengler | |
| 4,888,880 A | 12/1989 | Parker | |
| 4,979,310 A | 12/1990 | Wright | |
| 4,991,303 A | 2/1991 | Marth et al. | |
| 5,001,838 A | 3/1991 | Huxley et al. | |
| 5,020,232 A | 6/1991 | Whiteford | |
| 5,033,199 A | 7/1991 | Wilcox | |
| 5,105,549 A | 4/1992 | Johnson | |
| 5,134,780 A * | 8/1992 | Butler et al. | 33/366.11 |
| D330,682 S | 11/1992 | Butler et al. | |
| 5,181,352 A | 1/1993 | Friedman | |
| 5,199,177 A | 4/1993 | Hutchins et al. | |
| 5,253,154 A | 10/1993 | McMahan et al. | |
| 5,301,981 A | 4/1994 | Nesis | |
| 5,412,876 A | 5/1995 | Scheyer | |
| D364,104 S | 11/1995 | Johnson | |
| 5,531,031 A | 7/1996 | Green | |
| 5,535,523 A * | 7/1996 | Endris | 33/371 |
| 5,553,437 A | 9/1996 | Navon | |
| 5,617,641 A | 4/1997 | Aarhus et al. | |
| D392,198 S | 3/1998 | Doust | |
| D395,013 S | 6/1998 | Webb | |
| 5,774,996 A | 7/1998 | Ogawa | |
| 5,933,974 A | 8/1999 | Walters et al. | |
| 5,940,978 A | 8/1999 | Wright et al. | 33/381 |
| 5,950,761 A | 9/1999 | Murphy | |
| 5,966,826 A | 10/1999 | Ho | |
| 6,115,928 A | 9/2000 | Dauerer | |
| 6,148,530 A | 11/2000 | Jacoff et al. | |
| 6,173,502 B1 | 1/2001 | Scarborough | |
| D440,507 S | 4/2001 | Krehel et al. | |
| 6,279,240 B1 * | 8/2001 | Bonaventura, Jr. | 33/374 |
| 6,332,301 B1 | 12/2001 | Goldzak | |
| 6,360,446 B1 * | 3/2002 | Bijawat et al. | 33/451 |
| 6,370,833 B1 | 4/2002 | Rastegar | |
| 6,430,827 B2 | 8/2002 | Ruther | |
| 6,484,997 B1 | 11/2002 | Edwards et al. | |
| 6,505,454 B2 | 1/2003 | Dingler | |
| 6,568,095 B2 | 5/2003 | Snyder | |
| 6,643,942 B1 | 11/2003 | Russell | |
| 6,668,417 B1 | 12/2003 | Slattery | |
| 6,675,490 B1 | 1/2004 | Krehel et al. | |
| 6,681,494 B1 | 1/2004 | Bowden | |
| 6,694,632 B1 | 2/2004 | Schooley | |
| 6,715,879 B2 | 4/2004 | De Vaan | |
| 6,748,666 B2 | 6/2004 | Zugel | |
| 6,760,975 B1 | 7/2004 | Schmidt | |
| 6,792,686 B2 | 9/2004 | Krehel et al. | |
| 6,796,045 B2 | 9/2004 | Hallee | |
| 6,915,586 B2 * | 7/2005 | Hickey | 33/382 |
| 2002/0121025 A1 | 9/2002 | Leite | |
| 2003/0140511 A1 | 7/2003 | Obergoenner | |
| 2003/0163927 A1 | 9/2003 | Kallabis et al. | |
| 2004/0031230 A1 | 2/2004 | Pabedinskas et al. | |
| 2004/0143981 A1 | 7/2004 | Krehel et al. | |

FOREIGN PATENT DOCUMENTS

| | | |
|---|---|---|
| EP | 0 126 844 A2 | 12/1984 |
| GB | 2 210 167 A | 6/1989 |
| JP | 04-070715 | 3/1992 |
| JP | 10-170725 | 6/1998 |
| JP | 2000-347003 | 12/2003 |
| WO | WO 92/20998 | 11/1992 |

* cited by examiner

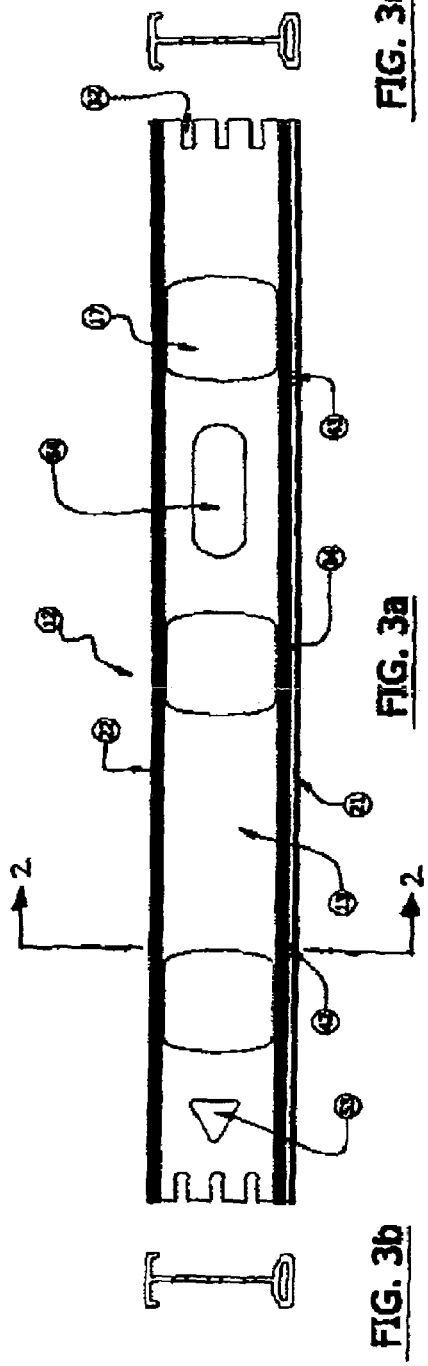
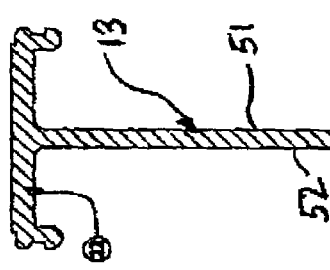
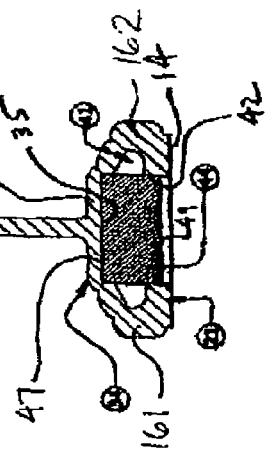
FIG. 3

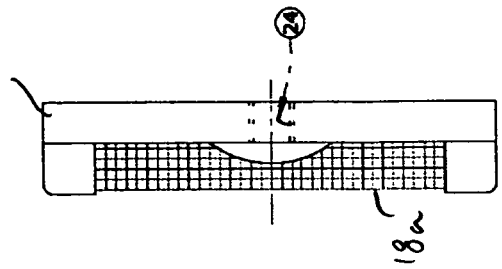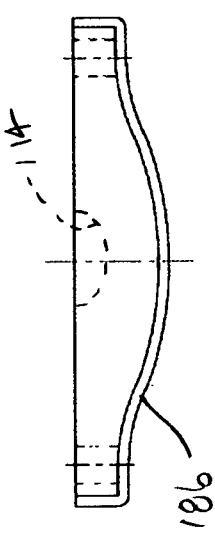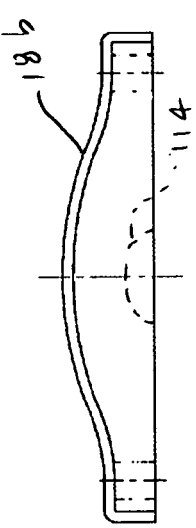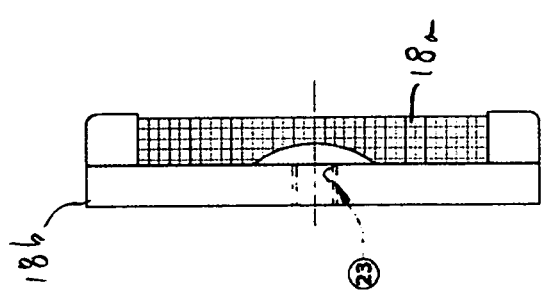

LEVEL

BACKGROUND OF THE INVENTION

1. Field of the Invention

The present invention relates to a level. In particular, embodiments of the present invention relate to an improved level incorporating, among other things, a structure for the positioning of magnets. Embodiments of the present invention also include levels having cross-sectional configurations that improve the torsional strength of the level, permitting the walls of the body of the beam to be made thinner with resultant reduction in material consumption making the level lightweight.

2. Background of the Related Art

Levels, also called bubble levels or spirit levels, are instruments used for setting horizontal or vertical surfaces. The level typically includes a sealed vial containing an entrapped air bubble floating in a liquid. The flatness of a horizontal or vertical surface may be determined by placing the operating planar surface of the level on or against the surface and viewing the position of the bubble against the predetermined graduated marks on the vial. Magnets have been used so that the level becomes magnetically attached to certain surfaces which are to be assessed. A level is illustrated in U.S. Pat. No. 4,463,501 to Wright et al., which is incorporated herein in its entirety by reference thereto.

SUMMARY OF THE INVENTION

One aspect of the invention relates to a level, including a body having first and second operative walls interconnected by a web, the first wall having a first exterior operative surface and the second wall having a second exterior operative surface, the first surface and the second surfaces facing in opposite directions and being generally parallel to one another; the body further comprising a stop structure disposed between the operative walls; a level vial carried by the body; the first exterior operative surface having an opening; and a magnet disposed in the opening and having one end abutting the stop structure, the magnet having an opposite end adjacent the first exterior operative surface for magnetically attracting a workpiece engaged with the first exterior operative surface.

Another aspect of the invention relates to a level, including: a body having first and second operative walls interconnected by a web, the first wall having a first exterior operative surface and the second wall having a second exterior operative surface, the first surface and the second surfaces facing in opposite directions and being generally parallel to one another; the body further comprising a stop structure disposed between the operative walls; a level vial carried by the body; and a reinforcing wall disposed closer to the first operative wall than the second operative wall, the reinforcing wall cooperating with the first operative wall to generally define a cavity.

Another aspect of the present invention is to provide a level having a I-beam extruded metallic body with a novel stop structure comprising an elongated flange disposed between the two opposing flanges of the I-beam and in close proximity to the lower flange of the I-beam with their longer edges joined together in a manner so as to form a cavity between wherein a permanent magnet is positioned through an aperture provided in the lower operative surface, with one end of the magnet engaging the elongated flange as a "stop" and the other end being flush with or adjacent the lower operative surface of the level.

Another aspect of the present invention is to provide a level having a box-beam metallic body and incorporating a novel stop structure comprising an elongated flange closer to the lower operative wall of the level with their longer edges joined together in a manner to form a cavity between them wherein a magnet is positioned through the an aperture provided in the exterior operative surface of the lower operative wall, with one end of the magnet abutting against the elongated flange as a 'stop' and other end being flush with or adjacent to the lower operative surface of the level.

A further aspect of the present invention is to provide a level having I-beam or box-beam body which has considerably enhanced torsional strength than the conventional body thereby enabling the walls of the I-beam or box-beam to be made thinner with resultant reduction in the consumption of the material and making the level light weight.

A still further aspect of the present invention is to provide a level which in I-beam configuration has serrated slots at each end which firmly engage the bosses of complementary shape provided in the end caps so as to firmly engage the end caps to the body of the level.

Other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF DRAWINGS

The invention is illustrated with drawings which represent one of the embodiment in which the present invention may be practiced. It is to be understood that the principles and features of the present invention may be embodied in variant embodiments incorporating changes and adaptations by those skilled in the art. Accordingly the invention is not deemed limited to the exact construction shown. All modifications and equivalents are intended to be within the scope of the present invention. In the accompanying drawings:

FIG. 3(a) is a plan view of the I-beam body with magnets in position within the apertures provided in the lower operative surface and without vials and end caps;

FIG. 3(b) is a side elevation view of the left end of the I-beam body of FIG. 3(a);

FIG. 3(c) is a side elevation view of the right end of the I-beam body of FIG. 3(a);

FIG. 3(d) is an enlarged view of the transverse section '2—2' of I-beam body of FIG. 3(a) through the axis of one of the cylindrical magnets in position;

FIG. 6(a) is a plan view of one of the vial assemblies fitted with contoured lens;

FIG. 6(b) is left side elevation view of the contoured lens;

FIG. 6(c) is the front elevation view of the contoured lens;

FIG. 6(d) is the rear elevation view of the contoured lens;

FIG. 6(e) is the right side elevation view of the contoured lens;

DETAILED DESCRIPTION OF THE ILLUSTRATED EMBODIMENTS

Figure 1:
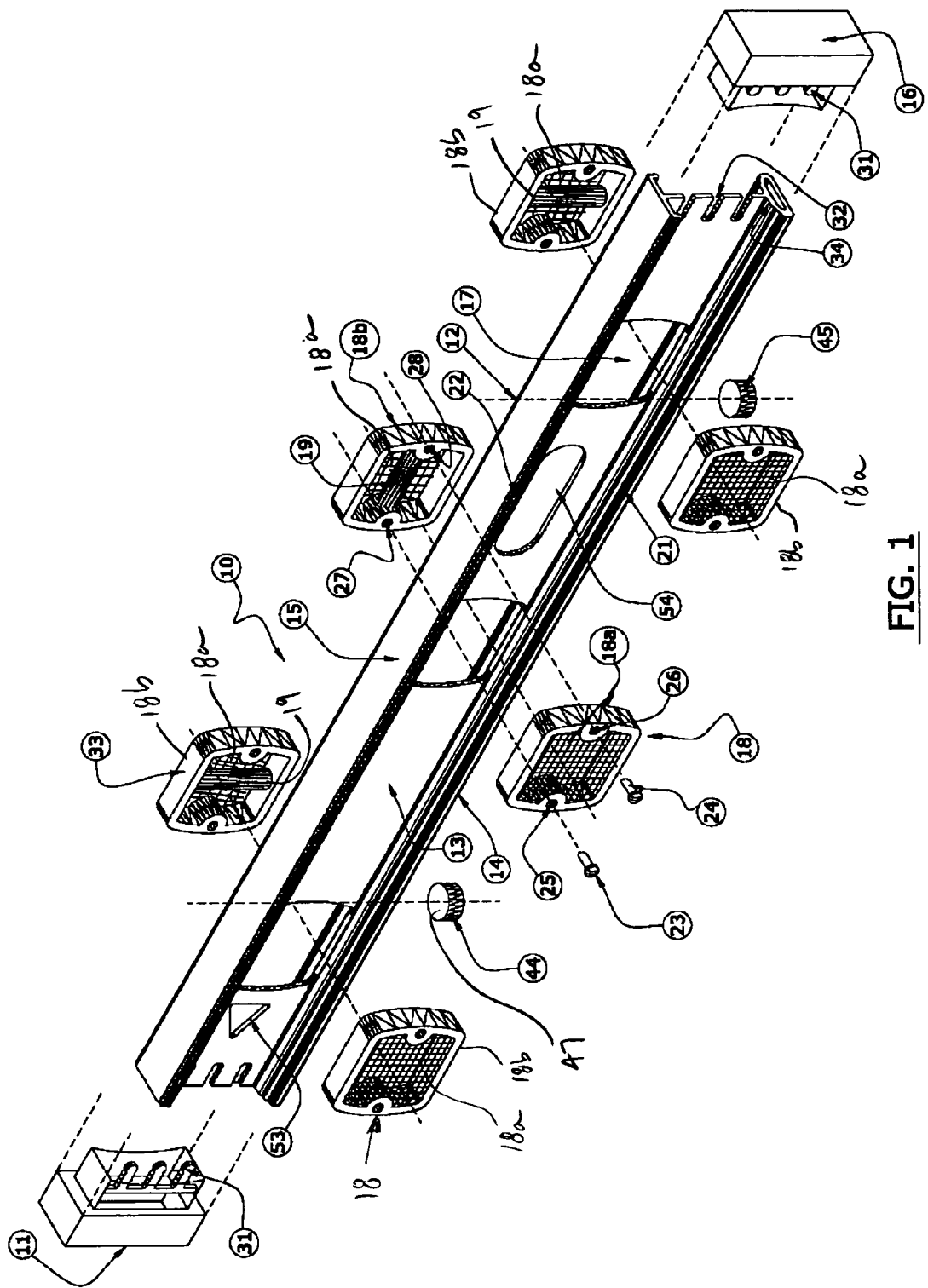
FIG. 1 is a perspective view of the level of the present invention showing exploded view of the plurality of bubble vials, cylindrical magnets and the end caps provided with bosses complementary in shape to the shape of the serrated slots on both the ends of the I-beam.

Reference is now made at FIG. 1 which illustrates a level 10 constructed and operative in accordance with one embodiment of the present invention. The level 10 includes an elongated body member 12 preferably made of a mechanically stable and durable metallic alloy. In one of the illustrated embodiments, the body 12 has an I-beam configuration in transverse section (best seen in FIG. 3(d)) with parallel operative walls 21 and 22 and an elongated wall member 34 (best seen in FIG. 3(d)) disposed generally in parallel between walls 21 and 22. The operative wall 22 and the elongated wall member 34 are interconnected along the longitudinal central lines by a planar web 13. The first operative wall 21 has first exterior operative surface 14 (best seen in FIG. 2(a)) and the second operative wall 22 has second exterior operative surface 15. The exterior operative surfaces 14 and 15 are generally parallel to each other and are facing in opposite directions. The operative surfaces 14 and 15 have typically highly accurate flatness and smoothness.

The I-beam body 12 has plurality of apertures 17 in the web 13 for receiving plurality of vial assemblies 18 each of which includes a pair of mounting members 18b having a lens cover 18a. The pair of mounting members 18b supporting a hermetically sealed bubble vial 19 positioned therebetween. In a manner discussed in more detail below with respect FIGS. 7 and 8, the apertures 17 in the web 13 have shape and dimensions aligned with the exterior contour and dimensions of the mount members 18(b) so that the latter may be snugly fitted and positioned within the apertures 17 and the contoured lens may be fitted thereto by fasteners 23 and 24. One of the vial assemblies is generally positioned around the longitudinal central location of the body 12 and one vial assembly is positioned at equidistant locations on either side of the centrally located vial assembly. One vial assembly is used to determine vertical orientation, other vial assembly measures horizontal orientation whereas the third vial assembly is adjustable to any desired orientation between vertical and horizontal. The end caps 11 and 16, preferably made of plastic, are fixed at each end of body 12. The shape of the bosses 31 provided in the end caps 11 and 16 is complementary to that of interior of slots 32 so that when end caps are press-fitted at each end, the bosses 31 of the end caps 11 and 16 engage into the serrated slots 32 of the I-beam body 12 whereby the end caps become firmly engaged to the I-beam body 12.

Figure 2:
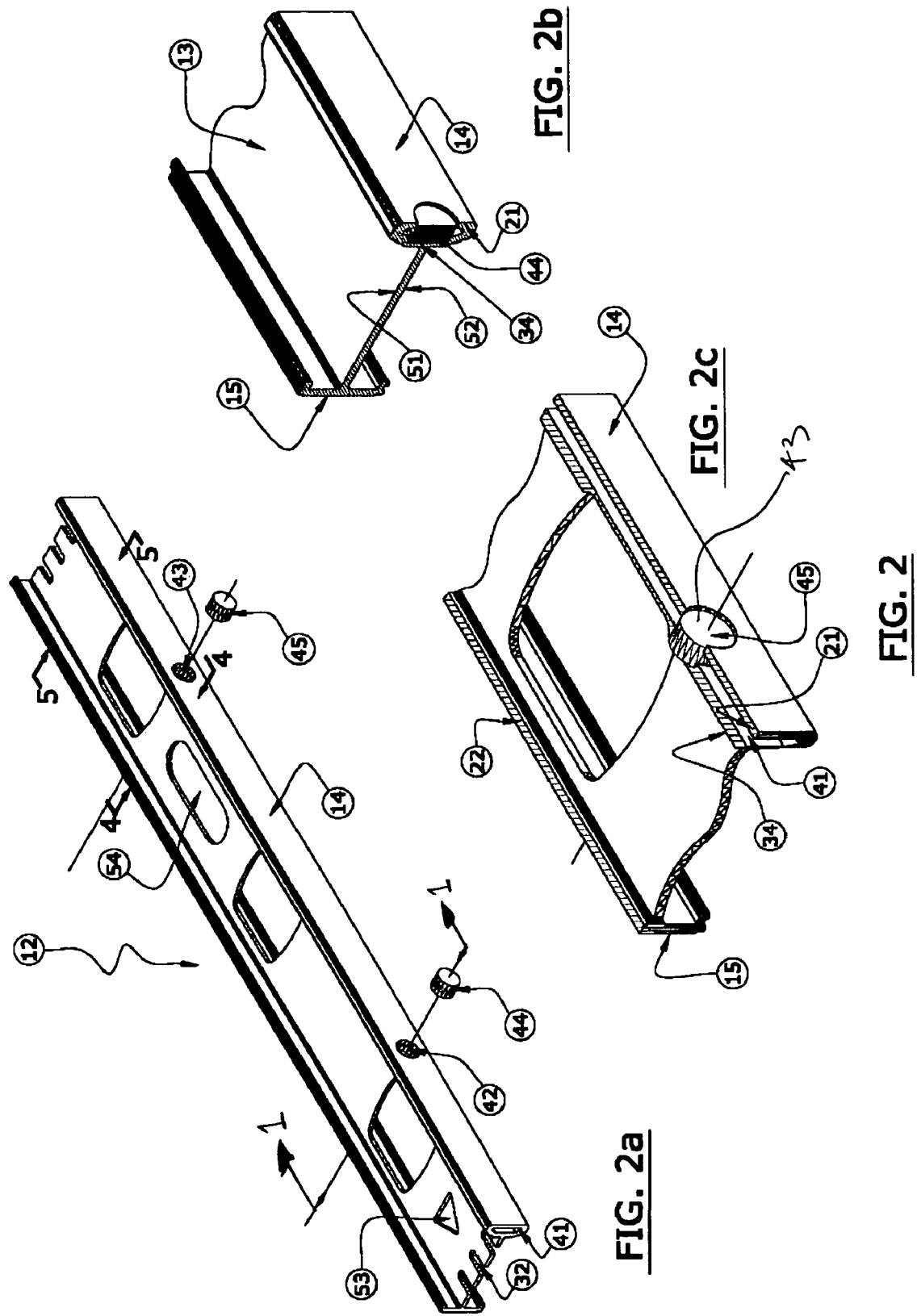
FIG. 2(a) is a perspective view of the I-beam body without vials and end caps and showing exploded view of the positioning of two cylindrical permanent magnets in the aligned apertures provided in the lower operative surface of the I-beam body.
FIG. 2(b) is an enlarged perspective view of the segment of the I-beam body towards the right of the plane along the line '1—1' through the axis of the cylindrical magnet in position.
FIG. 2(c) is an enlarged perspective view of the half-cut segment of the I-beam body between the planes of line '4—4' and '5—5' showing cylindrical magnet in installed position within the cavity between the lower operative surface and the elongated flange.

Referring to FIG. 2(a) and FIG. 2(c), the web 13 comprises a pair of spaced parallel side wall 51 and 52 (best seen in FIG. 2(b)) interconnecting the operative walls 21 and 22 of the I-beam body. The web 13 generally lies in a plane that bisects the surface of elongated wall member 34 as well as the inner surfaces of the operative walls 21 and 22. The wall surfaces 51 and 52 are opposite wall surfaces of the web 13 and, as illustrated FIG. 2b, cooperate together to form a solid wall member forming web 13. As seen in FIG. 2b, certain areas of web 13 will have a substantially rectangular, solid cross-section. Additional apertures as required may be provided in the web 13 such as an aperture 54 for easy gripping and handling of the level and a triangular slot 53 for suspending the level in vertical orientation from one of the corners of the triangular slot 53.

The illustrated embodiments described herein include at least one magnet for magnetically attaching the level to a surface. Although only one magnet may be necessary, it is preferred to have multiple magnets. Level 10 is illustrated as having multiple magnets. That is, preferably a pair of cylindrical permanent magnets 44 and 45 are positioned through the dimensionally aligned apertures 42 and 43, respectively, provided in the exterior operative surface 14 of the I-beam body 12. Although the magnets 44 and 45 are illustrated as being cylindrical, it should be understood that any appropriate magnet configuration may be employed. When magnets 44 and 45 are in position through the apertures 42, 43, respectively, in the exterior operative surface 14, one end of each of the cylindrical magnet 44, 45 abuts the elongated wall member 34 as a "stop" whereas the other end is substantially flush with or slightly recessed from the lower operative surface 14 of the body 12 preferably adjacent to the operative surface 14. FIG. 3d illustrates the positioning of magnet 44. Since the configuration and positioning of magnet 45 is substantially identical to that of magnet 44, only the positioning of magnet 44 is illustrated and described in detail. In particular, when magnet 44 is in position through the aperture 42 in the exterior operative surface 14, one end 47 of the cylindrical magnet 44 abuts the lower surface 35 of elongated wall member 34 and the lower surface 35 acts as a "stop" whereas the opposite end 49 is slightly recessed upwardly from the lower operative surface 14 so as to not affect the flatness of the surface 14. Thus, the elongated wall member 34 functions as a stop structure against which one end of each of the cylindrical magnets 44 and 45 abuts whereas the other end of the magnets is substantially flush with or recessed with respect to the operative surface 14. The stop surface 35 abutting the end 47 of magnet 44 enables precise positioning of the opposite end 49 relative to the operative surface 14. The positioning of the cylindrical magnet 45 within the cavity 41 and extending through the aligned aperture 43 from the lower operative surface 14 to the elongated flange 34 is best seen in the FIG. 2(c), which shows the magnet 45 in the installed position. The magnets 44 and 45 attract the metallic workpiece which becomes evenly attached to the exterior of the operative surface 14 thereby enabling accurate determination of the flatness of a surface. The magnets 44 and 45 may be secured in the openings 42 and 43, respectively, as appropriate, including by friction and/or by adhesive.

The elongated wall member 34 (also referred to herein as a "reinforcing wall", which is disposed between the two operative wall members 21 and 22, forms a closed cross-sectional configuration with the lower wall member 21 and side wall members 161 and 162 and thus reinforces the structure of the body 12 and improves the torsional strength of the I-beam body 12. The walls of the I-beam body 12 may therefore be made thinner enabling reduction in material consumption and making the level light in weight. As can be seen in FIG. 3d, the elongated wall member (or "reinforcing wall") 34 includes a first wall portion 95 and a second wall portion 97. The first portion 95 is connected at one end thereof to the planar wall web 13 and slopes downwardly to join the first side wall 161 at an opposite end thereof, while the second portion 97 is connected at one end thereof to the planar wall web 13 and slopes downwardly to join the second side wall 162 at an opposite end thereof.

Referring to FIG. 3(a) to FIG. 3(d), each end of I-beam body has substantially I-beam cross section as best seen in FIG. 3(b) and FIG. 3(c). The elongated wall member 34 is disposed between and is generally parallel to the two operative wall members 21 and 22. The elongated wall member 34 may be closer to the operative wall member 21 as compared to the operative wall member 22. The longer edges of the elongated wall member 34 are joined to the corresponding longer edges on the inner surface of the operative wall 21 so as to form a cavity 41 between wall members 34 and 21. As seen in FIG. 3d, the transverse section '2—2' through the axis of the cylindrical magnet 44 further illustrates the positioning of the cylindrical magnet 44 within the cavity 41.

Figure 4:
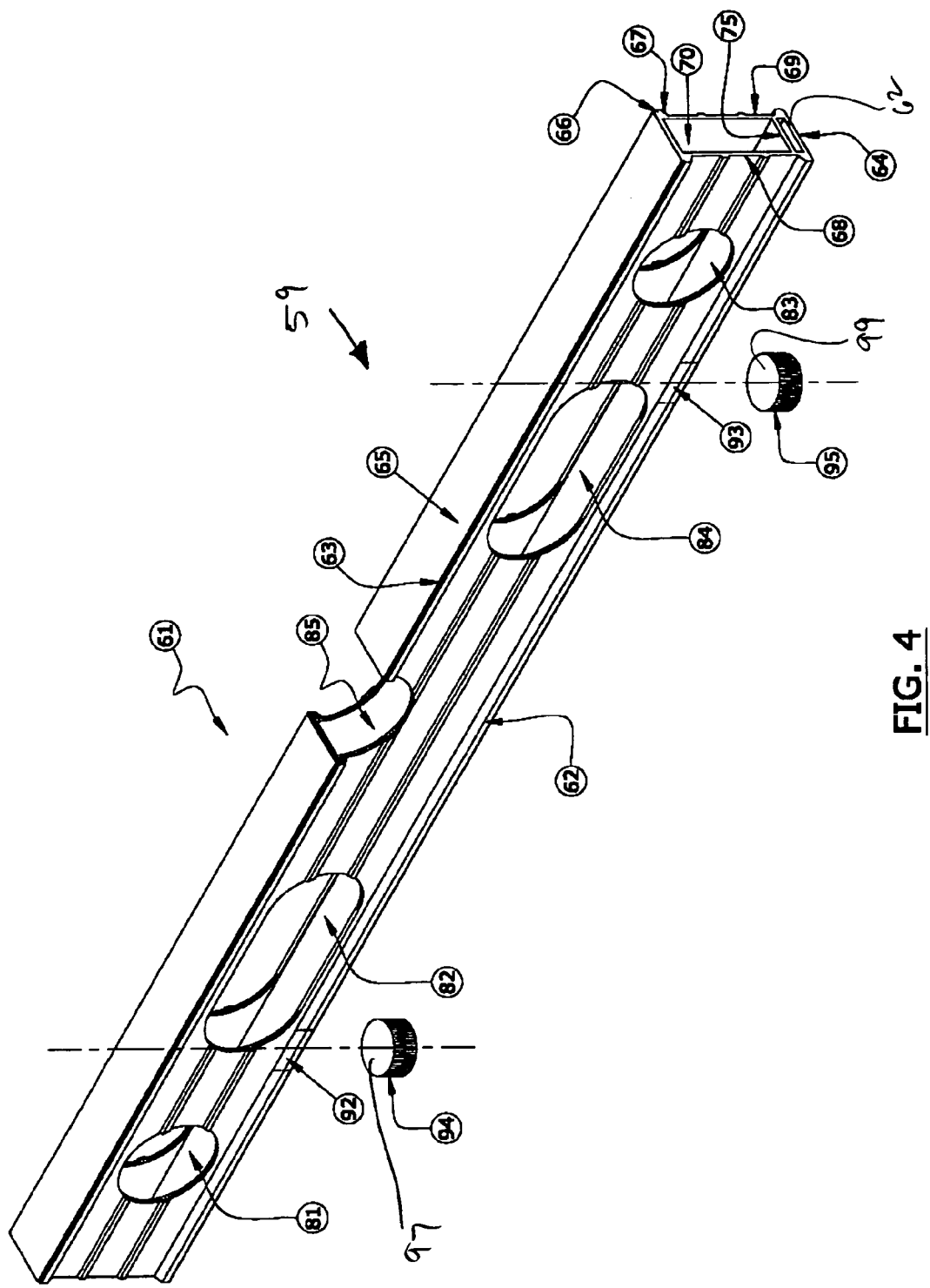
FIG. 4 is a perspective view of the box-beam body configuration of the level of the present invention without end caps and vials and showing exploded view of the cylindrical magnets.

Referring to FIG. 4, another embodiment of the metallic body of the level may have box-beam configuration which has the advantage that it resists twisting loads along the longitudinal axis more so than frame structures of a solid I-beam cross-sectional configuration. In the box-beam configuration, the metallic body 61 of a level 59 has a pair of oppositely oriented elongated operative walls 62 and 63 which are generally parallel to each other and have planar surface with flatness of high accuracy. The first operative wall 62 has first exterior operative surface 64 whereas the second operative wall 63 has second exterior operative surface 65 so that the exterior surfaces 64 and 65 are oppositely oriented and are substantially parallel. Each of the operative walls 62 and 63 has transversely spaced inwardly turned elongated flanges 66 extending along the length of their longer edges. The inwardly turned flanges 66 define the width of the exterior operative surfaces 64 and 65. A pair of angular walls 67 extends from each pair of transversely placed spaced flanges 66 in converging relation to one another. The operative walls 62 and 63 are interconnected by a pair of transversally spaced, substantially parallel walls 68 and 69 referred to hereinafter as 'central walls.' The central walls 68 and 69 are spaced apart in the direction of the width of the operative walls 62 and 63, at a distance less than the width of the operative walls 62 and 63 and are preferably equidistant from the transversal flanges 66 on either side. The central walls 68 and 69 are integrally connected with the angular walls 67 extending from the transversal flanges 66. Thus the pair of the walls 68 and 69 are cooperatively structured and integrally joined with the operative walls 62 and 63 to form substantially a rectangular elongated box beam interconnecting the operative walls 62 and 63. The four integral walls 62, 63, 68 and 69 together enclose substantially a rectangular shaped recessed opening 70 between them extending from one end of the beam to the other end of the beam. The end caps appropriate to the configuration are provided to close the opening at each end of the frame structure.

The central walls 68 and 69 have a central opening 85 on the periphery of their exterior operative surface 65 for receiving a horizontal level indicating vial assembly. The pair of central walls 68 and 69 further have a plurality of openings 81 and 83 extending therethrough, which are in spaced adjacent relation to the central opening 85. Each of the openings 81 and 83 is dimensionally aligned and configured to receive one of the vertical level indicating assemblies therein. The elongated slots 82 and 84 are configured to receive hand-hold assembly to facilitate handling of the box-beam body configuration.

Figure 5:
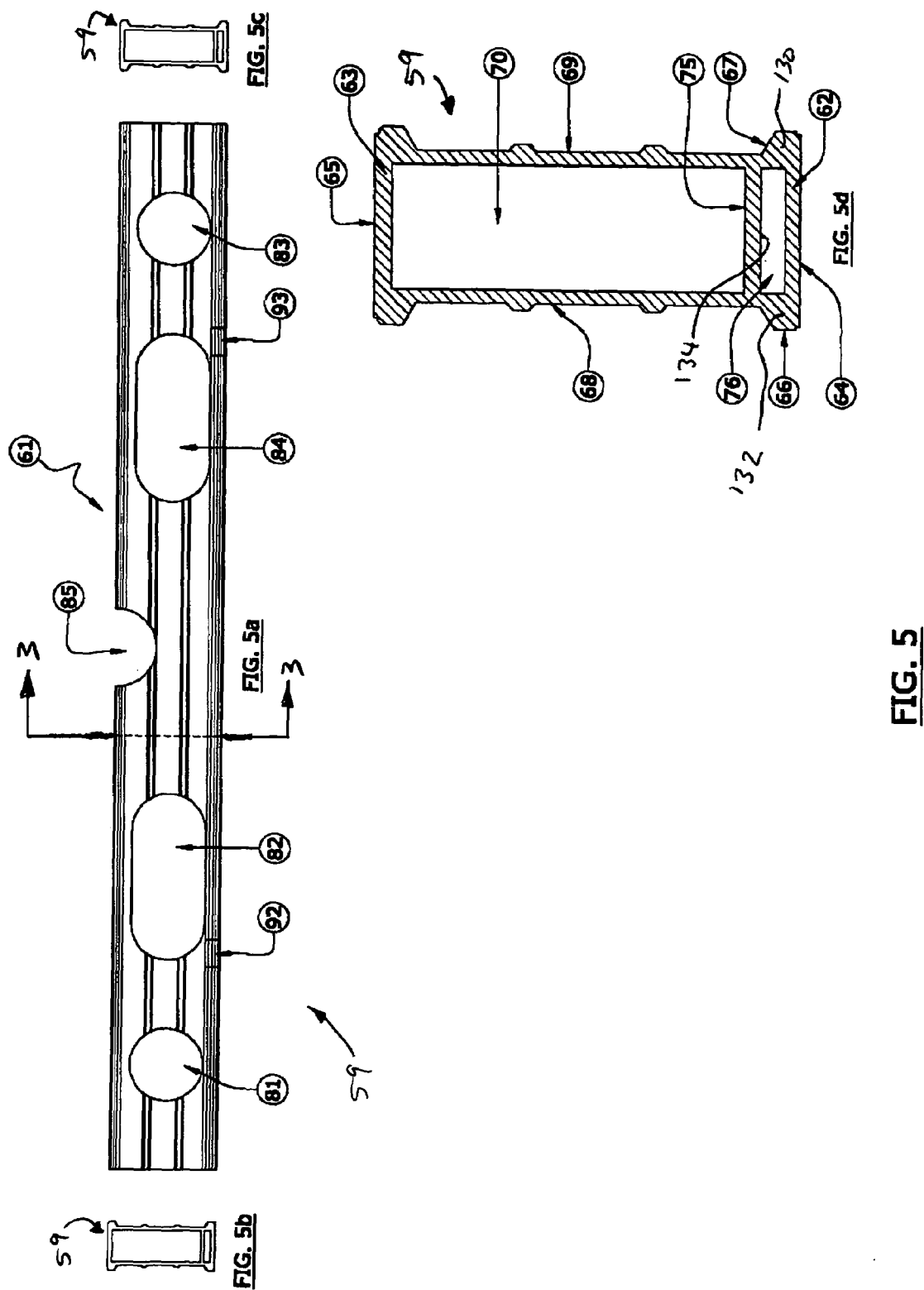
FIG. 5(a) is a plan view of the box-beam body configuration.
FIG. 5(b) is a side elevation view of the left end of the box-beam body of FIG. 5(a)
FIG. 5(c) is a side elevation view of the right end of the box-beam body of FIG. 5(a)
FIG. 5(d) is an enlarged view of the transverse section along the line '3—3'.

Referring to FIG. 5(a) to FIG. 5(d), an elongated wall member 75 is disposed between the central wall members 68 and 69 and between the operative walls 62 and 63. The elongated wall member 75 is generally parallel to the operative walls 62 and 63 and is comparatively closer to the wall 62. Each longer edge of the elongated wall member 75 is joined via side walls 130 and 132 with the operative wall 62 to form a cavity 76 extending throughout the length of the box-beam. The closed cross-section defining cavity 76 provides additional torsional rigidity and strength to the overall level structure, thus allowing less metal to be used if desired, without loss of strength, in comparison with a conventional box-beam level. Like the I-beam body configuration, the first exterior operative surface 64 has circular apertures 92 and 93 dimensionally aligned to receive therein cylindrical magnets 94 and 95, respectively. The cylindrical magnets 94 and 95 are positioned through the aligned apertures 92 and 93 within the cavity 76 so that one end of each of the magnet abuts against the elongated wall member 75 as a "stop" and the other end of each of the magnet is substantially flush with or slightly recessed from the exterior operative surface 64 of the box-beam. The magnets 94 and 95 and their respective insertion into body 61 via apertures 92 and 93 and the use of wall member 75, and particularly surface 134 thereof, as a "stop" for abutting against the respective upper surfaces 97 and 99 of magnets 94 and 95 is substantially identical to that illustrated and described above with respect to magnets 44 and 45 above in level 10. In such a positioning arrangement, the placement of magnets 94 and 95 does not compromise the flatness of the operative surface 64 of the level and thereby enables the level 59 to determine the flatness of a surface with relatively higher precision. Throughout the length of the box-beam from one end to another end, the box-beam has substantially rectangular shaped opening 70 as best seen in FIG. 5d.

Figure 7:
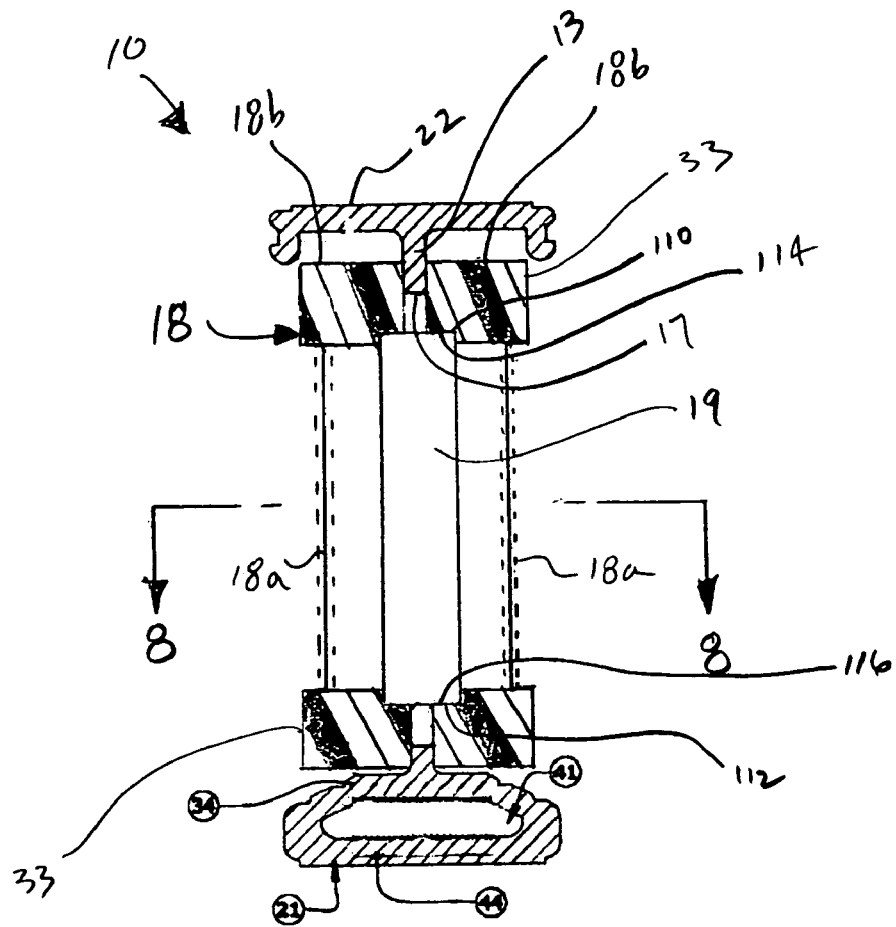
FIG. 7 is a cross-sectional view similar to FIG. 3d but taken through the center of a vial.
Figure 8:
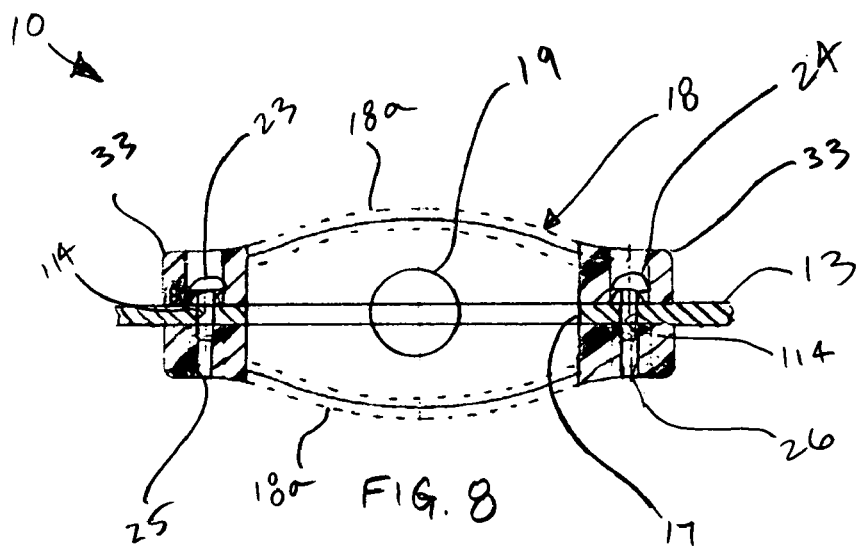
FIG. 8 is a cross-section view taken along line 8—8 in FIG. 7.

Referring to FIG. 6, the bubble vial 19 (best seen installed in the lever 10 in FIG. 1) is a sealed vial generally cylindrical in shape containing a floating air bubble entrapped in a liquid, preferably an antifreeze solution. The sealed vial is made of transparent material such as plastic or glass to facilitate viewing of the position of the floating air bubble in the vial. The plastic generally used for vial production is an acrylic thermoplastic polymer which has high degree of transparency and dimensional stability. However other materials having similar properties may also be used for producing vials. Two ends 110 and 112 of the bubble vial 19 are attached to the inner periphery 114 and 116 of the edges 33 of the pair of mount members 18b of the vial assembly 18 by a suitable fastening device. For example, fasteners 23 and 24, such as a nut and bolt assembly or threaded fasteners, may be inserted into openings 25 and 26 in each one of the pair of bracket members 18b. The sizing of the bracket members 18*b* is such that the bracket members 18*b* abut the web 13 around the perimeter of the respective opening in web 13, such as opening 17. The sealed vial 19 has spaced line indicators of usual type over its periphery for determining the flatness of a horizontal or vertical surface with the help of position of the bubble with respect to these indicator lines. The lens covers 18*a* are contoured so that the range of angles from which the vial 19 can be viewed increases so that the vial 19 is more easily read. In preferred embodiments, the contour is approximately a 1.75 inch radius. Since a contoured lens cover 18*a* is on both sides of the vial 19, the vial 19 can be easily read from either side of the lever 10. For installation, the pair of mount members 18*b* are placed on opposite sides of web and over openings in web 13 such as opening 17. The two mount members are fixed to each other and clamp the web 13 therebetween by the tightening action of the fasteners 23 and 24 either by passing fasteners 23 and 24 through holes 114 in web 13 or by passing fasteners 23 and 24 through the opening in web 13, such as opening 17. The fasteners 23, 24 may be threadably received in the co-operative threaded openings 25, 26, 27 and 28 in the mount members 18*b*. Additionally, although the lens covers 18*a* are configured to be arcuate, the lens covers may be generally flat as illustrated in FIG. 1 or curved as illustrated in FIGS. 7 and 8. Also, although the mount members 18*b* illustrated in FIGS. 7 and 8 together position the vial 19, the vial may be secured to one mount member 18*b* as illustrated in FIG. 1.

Thus it will be seen from the foregoing that a level of the present invention has a stop structure for positioning of a pair of magnets. The stop structure may be embodied in I-beam body configurations as well as in box-beam body beam configuration. The stop structure comprises an elongated wall member disposed between and generally parallel to the operative walls of the beam body of the level. The elongated wall member is closer to the lower operative wall and their longer edges are joined together in a manner so as to form a cavity between them. The magnets are positioned in the cavity through dimensionally aligned apertures provided in the lower operative surface of the body so that one end of the each of the magnet abuts the elongated wall member as a "stop" and other end is substantially flush or slightly recessed from the lower operative surface of the level.

The positioning arrangement of magnet per the foregoing description enables positioning of the magnets within the boundaries of the lower operative surface and the elongated flange. Such positioning of magnet does not in any way interfere or compromise with the flatness of the operative surface of the level. The arrangement of the magnet per the present invention enables a user to determine the flatness of a surface with relatively higher precision while employing a magnetic level. Such positioning arrangement for a magnet also obviates the need for a long, heavier and expensive magnet. In the illustrated embodiments, of the subject application, two small magnets are positioned through the dimensionally aligned slots in the lower operative surface. Thus, a level in accordance with the invention may be lighter and less expensive than previously known levels. The elongated wall 34 also reinforces the operative walls of the beam frame of the level due to which the level body of the present invention has considerably improved torsional strength to resist twisting loads along the longitudinal axis. Thus, the walls of the body can be made relatively thinner without compromising the requisite torsional strength of the body of the level. This in turn enables reduction in material consumption and makes the level economical in cost as well as lighter in weight. In addition, the proximity of walls 34 and 75 to the respective operative surfaces 14 and 64 allow a relatively short magnet to be used. In the I-beam frame configuration, each end of the I-beam body of the level of the present invention has serrated slots that engage the bosses of the end caps having shape complementary to the shape of the serrated slots thereby enabling firm engaging of the end caps to the body of the level. A contoured lens 18*a* is provided over each of the bubble vials 19 in order to improve the range of angles from which the graduations on the vial 19 can be easily read to determine the flatness of a surface.

The foregoing specific embodiments have been provided to illustrate the structural and functional principles of the present invention, and are not intended to be limiting. To the contrary, the present invention is intended to encompass all modifications, alterations, and substitutions within the spirit and scope of the appended claims.

The invention claimed is:

1. A level, comprising:
   a body having first and second operative walls interconnected to one another, said first wall having a first exterior operative surface and said second wall having a second exterior operative surface, said first surface and said second surface facing in opposite directions and being generally parallel to one another, said body having a cross-section region that is generally symmetric about a plane that bisects the first and second operative walls, said body further comprising spaced side walls joining opposite ends of the first operative wall,
   a stop structure disposed between said operative walls, the stop structure joining the side walls,
   said stop structure, said side walls, and said first operative wall generally defining a cavity therebetween, said cavity having a generally closed transverse cross-section and a non-cylindrical configuration;
   level vial carried by said body;
   said first exterior operative surface having an opening; and
   a magnet disposed in said opening and having one end abutting said stop structure, said magnet having an opposite end adjacent said first exterior operative surface for magnetically attracting a workpiece engaged with said first exterior operative surface.

2. A level according to claim 1, wherein said spaced side walls connect with said operative walls to form a generally rectangular shaped cross section: and only portions of the side walls cooperate with the first operative wall and stop structure to define the cavity.

3. A level according to claim 2, wherein said stop structure comprises an elongated wall member having the opposing longer edges thereof connected to the spaced parallel side walls.

4. A level according to claim 1, wherein said first and second operative walls are interconnected via a generally planar wall, said planar wall lying in the plane that generally bisects said first and second operative walls.

5. A level according to claim 4, wherein said stop structure comprises an elongated wall structure, and wherein said generally planar wall is joined with said elongated wall structure, the elongated wall structure comprising a first wall portion sloping generally downwardly from the planar wall to a first of the side walls and a second wall portion sloping generally downwardly from the planar wall to a second of the side walls.

6. A level according to claim 5, wherein said generally planar wall lies in the plane that bisects said first and second operative walls.

7. A level according to claim 1, wherein said stop structure comprises an elongated wall structure.

8. A level according to claim 7, wherein said elongated wall member is closer to said first operative wall than said second operative wall.

9. A level according to claim 1, wherein said spaced side walls and the first and second operative walls form a generally rectangular cross section, wherein the stop structure comprises a reinforcing wall disposed generally parallel to said first and second operative walls.

10. A level, comprising:
a body having first and second operative walls interconnected to one another, said first wall having a first exterior operative surface and said second wall having a second exterior operative surface, said first surface and said second surface facing in opposite directions and being generally parallel to one another, said body having a cross-section region that is generally symmetric about a plane that bisects the first and second operative walls;
a level vial carried by said body;
spaced side walls joining opposite ends of the first operative wall;
a reinforcing wall disposed closer to said first operative wall than said second operative wall, said reinforcing wall joining the side walls and cooperating with said first operative wall to generally define a cavity therebetween, said cavity having a non-cylindrical configuration and a generally closed transverse cross-section.

11. A level according to claim 10, wherein said first operative wall has an opening, and further comprising a magnet received in said cavity through said opening.

12. A level according to claim 11, wherein said magnet has one end thereof abutting said reinforcing wall.

13. A level according to claim 10, wherein said first and second operative walls are interconnected by the spaced side walls to form a generally rectangular shaped cross section.

14. A level according to claim 10, wherein said first and second operative walls are interconnected by a web comprising a generally planar wall connected to the reinforcing wall, said planar wall lying in the plane that generally bisects said first and second operative walls.

15. A level according to claim 14, wherein said reinforcing wall comprises a first wall portion sloping downwardly from a first side of the planar wall to a first of the side walls, and a second wall portion sloping downwardly from a second side of the planar wall to a second of the side walls.

16. A level according to claim 10, wherein the reinforcing wall and the first operative wall define only a single cavity therebetween.

17. A level according to claim 10, wherein the first operative wall includes a plurality of spaced openings formed therein, so as to provide the cavity with spaced regions of a generally open cross-section.

18. A level according to claim 17, further comprising a plurality of magnets, each of which is disposed in a respective one of the openings.

19. A level according to claim 10, further comprising end caps attached to opposite ends of the body.

20. A level, comprising:
first and second operative walls interconnected by a web, said first wall having a first exterior operative surface and said second wall having a second exterior operative surface, said first surface and said second surface facing in opposite directions and being generally parallel to one another:
a vial carried by said web;
a reinforcing wall disposed closer to said first operative wall than said second operative wall, said reinforcing wall cooperating with said first operative wall to generally define a single cavity therebetween;
spaced side walls joining opposite ends of the first operative wall;
said web comprising a generally planar wall joining the reinforcing wall and lying in a plane generally bisecting the first and second operative walls; and
the single cavity having a non-cylindrical configuration and a generally closed transverse cross-section.

21. A level according to claim 20, wherein the reinforcing wall comprises a first portion sloping downwardly from the planar wall to a first of the side walls and a second portion sloping downwardly from the planar wall to a second of the side walls.

22. A level according to claim 21, wherein the spaced side wall members are parallel to one another and connect the reinforcing wall with said first operative wall to define said cavity.

23. A level according to claim 21, wherein said magnet has one end thereof abutting said reinforcing wall, which acts as a stop for said magnet.

24. A level according to claim 20, wherein said generally planar wall is connected at a first end thereof to the second operative wall and is connected at a second end thereof to the reinforcing wall, said generally planar wall hence interconnecting the first and second walls.

25. A level according to claim 20, wherein said first operative wall has an opening, and further comprising a magnet received in said cavity through said opening.

26. A level, comprising:
first and second operative walls, said first wall having a first exterior operative surface and said second wall having a second exterior operative surface, said first surface and said second surface facing in opposite directions and being generally parallel to one another;
a reinforcing wall disposed closer to said first operative wall than said second operative wall, said reinforcing wall cooperating with said first operative wall to generally define a single cavity therebetween;
said single cavity having a non-cylindrical shape and a generally closed cross-section;
a generally planar wall positioned between said second operative wall and said first operative wall, said generally planar wall lying in a plane that generally bisects said first and second operative walls;
spaced side walls joining opposite ends of the first operative wall and also joining the reinforcing wall; and
a vial carried by said level.

27. A level according to claim 26, wherein the reinforcing wall comprises a first portion disposed on a first side of the plane and a second portion disposed on a second side of the plane, the first portion sloping from the planar wall to a first of the side walls, the second portion sloping from the planar wall to a second of the side walls.

28. A level according to claim 26, wherein said first operative wall has an opening, and further comprising a magnet received in said cavity through said opening.

29. A level according to claim 28, wherein said magnet has one end thereof abutting said reinforcing wall, which acts as a stop for said magnet.

30. A level according to claim 26, wherein the first operative wall includes a plurality of spaced openings formed therein, so as to provide the cavity with spaced regions of a generally open cross-section.

31. A level according to claim 30, further comprising a plurality of magnets, each of which is disposed in a respective one of the openings.

32. A level, comprising:
first and second operative walls, said first wall having a first exterior operative surface and said second wall having a second exterior operative surface, said first surface and said second surface facing in opposite directions and being generally parallel to one another;
a generally planar wall disposed between said first and second operative walls and that lies in a plane that generally bisects the first and second operative walls, the first operative wall being on a first side of the planar wall and the second operative wall being on a second side of the planar wall opposite the first side;
a vial carried by said generally planar wall; and
a plurality of wall members disposed on the first side of the planar wall and cooperating with said first operative wall to form a non-cylindrical, generally closed cross-sectional configuration, the plurality of wall members including a first side wall, a second side wall, a first sloping wall portion connecting the planar wall with the first side wall, and a second sloping wall portion connecting the planar wall with the second side wall.

33. A level according to claim 32, wherein the side wall members are parallel to one another.

34. A level according to claim 33, wherein said first and second sloping wall portions comprises an elongated wall.

35. A level according to claim 34, wherein said generally planar wall intersects said elongated wall.

36. A level according to claim 35, wherein said elongated wall is disposed closer to said first operative wall than said second operative wall.

37. A level according to claim 35, wherein said planar wall intersects said second operative wall.

38. A level according to claim 32, further comprising at least one opening in said first operative wall, and a magnet received within said at least one opening and extending within the closed cross-sectional configuration.

39. A level according to claim 32, wherein said first and second sloping wall portions serves as a stop for said at least one magnet.

40. A level according to claim 32, wherein said operative walls, said generally planar wall and said plurality of wall members are formed from a metallic alloy.

41. A level according to claim 40, wherein said generally closed cross-sectional configuration generally forms a triangular shape.

42. A level according to claim 41, wherein said generally planar wall intersects an upper portion of said triangular shape.

43. A level according to claim 32, wherein said generally planar wall intersects said second operative wall.

* * * * *